United States Patent
Ikeda et al.

(10) Patent No.: US 11,492,506 B2
(45) Date of Patent: Nov. 8, 2022

(54) AQUEOUS INK JET COMPOSITION

(71) Applicant: Seiko Epson Corporation, Tokyo (JP)

(72) Inventors: Yasunari Ikeda, Shiojiri (JP); Hirofumi Hokari, Chino (JP); Shinichi Yamamoto, Matsumoto (JP); Shigeki Kawada, Shiojiri (JP); Michio Nakamori, Matsumoto (JP)

(73) Assignee: SEIKO EPSON CORPORATION

( * ) Notice: Subject to any disclaimer, the term of this patent is extended or adjusted under 35 U.S.C. 154(b) by 496 days.

(21) Appl. No.: 16/727,020

(22) Filed: Dec. 26, 2019

(65) Prior Publication Data

US 2020/0207997 A1   Jul. 2, 2020

(30) Foreign Application Priority Data

Dec. 27, 2018 (JP) .............................. JP2018-245646

(51) Int. Cl.
| | | |
|---|---|---|
| C09D 11/322 | (2014.01) | |
| C08K 5/42 | (2006.01) | |
| C08K 5/45 | (2006.01) | |
| C08L 41/00 | (2006.01) | |
| C08L 25/08 | (2006.01) | |
| C09D 11/10 | (2014.01) | |
| C09D 11/38 | (2014.01) | |
| C09D 11/328 | (2014.01) | |
| C08L 25/14 | (2006.01) | |

(52) U.S. Cl.
CPC .............. C09D 11/322 (2013.01); C08K 5/42 (2013.01); C08K 5/45 (2013.01); C08L 25/08 (2013.01); C08L 41/00 (2013.01); C09D 11/10 (2013.01); C09D 11/328 (2013.01); C09D 11/38 (2013.01); *C08L 25/14* (2013.01)

(58) Field of Classification Search
CPC .. C08K 5/42; C08K 5/45; C08L 41/00; C08L 25/08; C08L 25/14; C09D 11/322; C09D 11/10; C09D 11/38; C09D 11/328
See application file for complete search history.

(56) References Cited

U.S. PATENT DOCUMENTS

2008/0070009 A1   3/2008  Akatani et al.

FOREIGN PATENT DOCUMENTS

JP    2016-190935 A    11/2016
WO   WO-2005-121263 A1   12/2005

*Primary Examiner* — Patrick D Niland
(74) *Attorney, Agent, or Firm* — Harness, Dickey & Pierce, P.L.C.

(57) ABSTRACT

An aqueous ink jet composition according to the present disclosure includes: C.I. Disperse Red 364 as a first component; a second component which is a dispersant having a chemical structure of at least one of a sulfo group and a salt thereof; and a third component having an indigo skeleton and a chemical structure of at least one of a sulfo group and a salt thereof.

6 Claims, No Drawings

AQUEOUS INK JET COMPOSITION

The present application is based on, and claims priority from, JP Application Serial Number 2018-245646, filed Dec. 27, 2018, the disclosure of which is hereby incorporated by reference herein in its entirety.

BACKGROUND

1. Technical Field

The present disclosure relates to an aqueous ink jet composition.

2. Related Art

In recent years, the application of ink jet printing has been increased, and besides printing by office and household printers, the ink jet printing is also applied to commercial printing, textile printing, and the like.

In addition, an ink-jet ink containing a fluorescent dye has also been used.

As a fluorescent dye having an excellent fluorescent intensity, C.I. Disperse Red 364 may be mentioned.

However, when the above fluorescent dye is applied to an ink-jet ink, compared to the other coloring materials, there have been problems in that storage stability of the ink-jet ink is low, and foreign materials are liable to be generated in the ink-jet ink during storage thereof.

In order to improve dispersibility of the fluorescent dye, there has been proposed an ink including an anionic dispersant and a compound formed from at least one of an ethylene oxide adduct of phytosterol, an ethylene oxide adduct of hydrogenated phytosterol, an ethylene oxide adduct of cholestanol, and an ethylene oxide adduct of hydrogenated cholestanol (see International Publication No. WO2005/121263).

However, when an ink-jet ink containing the fluorescent dye described above is stored for a long time or is placed in an environment in which a thermal stress is applied, problems, such as an increase in particle size, an increase in viscosity, and generation of foreign materials, cannot be sufficiently suppressed, and as a result, an ejection defect of the ink-jet ink caused by clogging of a head filter and/or a nozzle is liable to occur.

In order to solve the problems as described above, as a dispersant improving the dispersibility of the fluorescent dye described above, although the use of a dispersant having a relatively high hydrophobic property is considered, since the dispersant as described above has a low water solubility, for example, when the ink-jet ink is placed in an environment in which the ink is easily liable to be dried, that is, when nozzles are operated in an idle mode, or when the ink-jet ink is left for a long time, in particular, a solid component of the ink-jet ink is liable to be precipitated. When the solid component is precipitated, clogging of a head filter and/or a nozzle occurs, and the ejection defect of the ink-jet ink may arise.

In order to suppress the precipitation of the solid component of the ink-jet ink caused by the drying as described above and the generation of the defect thereby, although a dispersant having a low hydrophobic property, such as a dispersant having a sulfo group, is effectively used, in the case described above, the storage stability of the ink-jet ink tends to be more seriously degraded.

That is, in an ink-jet ink containing the fluorescent dye as described above, heretofore, it has been difficult to simultaneously obtain the storage stability and suppression of the generation of clogging of a head filter and/or a nozzle caused by drying.

SUMMARY

The present disclosure was made to solve the problems described above and can be realized as the following application examples.

An aqueous ink jet composition according to an application example of the present disclosure comprises: C.I. Disperse Red 364 as a first component; a second component which is a dispersant having a chemical structure of at least one of a sulfo group and a salt thereof; and a third component having an indigo skeleton and a chemical structure of at least one of a sulfo group and a salt thereof.

In addition, in an aqueous ink jet composition according to another application example of the present disclosure, the second component may be at least one selected from the group consisting of a formalin condensate of sodium naphthalenesulfonate, sodium ligninsulfonate, and a styrene-sodium styrenesulfonate copolymer.

In addition, in an aqueous ink jet composition according to another application example of the present disclosure, the third component may be C.I. Acid Blue 76.

In addition, in an aqueous ink jet composition according to another application example of the present disclosure, when the content of the first component and the content of the second component are each represented by X1 and X2, respectively, in percent by mass, $0.2 \leq X2/X1 \leq 5.0$ may hold.

In addition, in an aqueous ink jet composition according to another application example of the present disclosure, when the content of the first component and the content of the third component are represented by X1 and X3, respectively, in percent by mass, $0.005 \leq X3/X1 \leq 0.400$ may hold.

In addition, in an aqueous ink jet composition according to another application example of the present disclosure, when the content of the second component and the content of the third component are represented by X2 and X3, respectively, in percent by mass, $0.004 \leq X3/X2 \leq 0.300$ may hold.

DESCRIPTION OF EXEMPLARY EMBODIMENTS

Hereinafter, preferable embodiments of the present disclosure will be described in detail.

Aqueous Ink Jet Composition

Among various types of fluorescent dyes, although having features, such as an excellent fluorescent intensity, C.I. Disperse Red 364 has the following problems. That is, when the fluorescent dye described above is used as a constituent component of an aqueous ink jet composition, heretofore, it has been difficult to simultaneously obtain the storage stability of the aqueous ink jet composition and the suppression of clogging of a head filter and/or a nozzle caused by drying.

Accordingly, while the excellent features of the fluorescent dye described above are obtained, in order to simultaneously obtain the storage stability of an aqueous ink jet composition containing the above fluorescent dye and the suppression of clogging of a head filter and/or a nozzle caused by drying, the present inventor carried out intensive research, and as a result, the present disclosure was finally made.

That is, an aqueous ink jet composition of the present disclosure comprises: C.I. Disperse Red 364 as a first component; a second component which is a dispersant having a chemical structure of at least one of a sulfo group and a salt thereof; and a third component having, besides an indigo skeleton, a chemical structure of at least one of a sulfo group and a salt thereof.

By the structure as described above, while the excellent features of the first component are obtained, an aqueous ink jet composition which simultaneously obtains the storage stability and the suppression of clogging of a head filter and/or a nozzle caused by drying can be provided.

The reason the excellent effects as described above can be obtained is believed that since the second component as a sulfonic acid-based dispersant having a chemical structure of at least one of a sulfo group and a salt thereof, each of which has a high hydrophilic property, is used, the aqueous ink jet composition can be effectively prevented from being dried at a nozzle and the like, and in addition, since the third component having an indigo skeleton which is a chemical structure common to that of the first component and $SO_3$ which is a chemical structure common to that of the second component is contained, dispersion stability of the first component can be improved.

In addition, in this specification, the indigo skeleton indicates the structure represented by the following formula (1), the structure in which at least one hydrogen atom of the structure described above is substituted by another atom or an atom group, or the structure in which a sulfo group is introduced into at least one of the carbonyl groups of the structure described above.

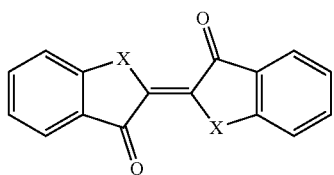

(1)

In the formula (1), two Xs each independently represent S, NH, or $CH_2$.

As a material having an indigo skeleton in which a sulfo group is introduced into at least one of the carbonyl groups, for example, there may be mentioned C. I. Solubilized Vat Blue 1, C. I. Solubilized Vat Orange 5, C. I. Solubilized Vat Red 1, C. I. Solubilized Vat Red 5, C. I. Solubilized Vat Red 6, C. I. Solubilized Vat Violet 2, or C. I. Solubilized Vat Violet 4.

For example, C. I. Solubilized Vat Red 6 has a chemical structure represented by the following formula (2).

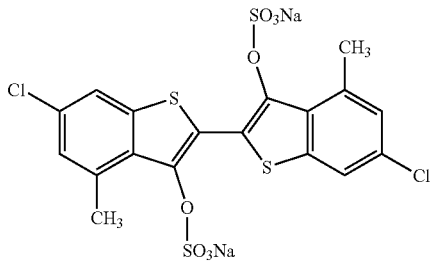

(2)

In addition, in this specification, the aqueous ink jet composition is a concept including, besides an ink itself to be ejected by an ink jet method, a stock solution to be used for preparation of the ink described above. In other words, the aqueous ink jet composition of the present disclosure may be a composition to be ejected by an ink jet method without any treatment or a composition to be ejected by an ink jet method after a treatment, such as a dilution treatment, is performed. In addition, in this specification, the aqueous ink jet composition is a composition containing at least water as a primary volatile liquid component, and the rate of the water in the volatile liquid component forming the aqueous ink jet composition is preferably 40 percent by mass or more, more preferably 50 percent by mass or more and further preferably 70 percent by mass or more.

On the other hand, when the conditions as described above are not fulfilled, a satisfactory result cannot be obtained. For example, when another fluorescent dye is used instead of using the first component, in a recording portion formed using the aqueous ink jet composition, it is difficult to obtain a sufficient fluorescent intensity. In addition, in this specification, the "recording portion" is a concept including, besides a portion of a recording medium to which the aqueous ink jet composition is applied by an ink jet method, a portion to which a constituent component of the aqueous ink jet composition is transferred when the aqueous ink jet composition is applied to a thermal transfer printing method, such as sublimation dyeing.

In addition, when the second component is not used, the aqueous ink jet composition is difficult to have a sufficiently excellent dispersion stability, and foreign materials are liable to be generated in the aqueous ink jet composition during storage thereof.

In addition, when a dispersant other than the sulfonic acid-based dispersant, such as a dispersant having a high hydrophobic functional group, such as a carboxyl group, as compared to that of a sulfo group, is used instead of using the second component, if an ink-jet ink functioning as the aqueous ink jet composition is placed in an environment in which the ink is easily liable to be dried, that is, for example, if nozzles are operated in an idle mode, or if the ink-jet ink is left for a long time, a solid component of the aqueous ink jet composition is particularly liable to be precipitated, and hence, an ejection defect of the aqueous ink jet composition caused, for example, by clogging of a head filter and/or a nozzle is liable to occur.

In addition, when the third component is not used, the storage stability of the aqueous ink jet composition is low, and foreign materials are liable to be generated in the aqueous ink jet composition during the storage thereof.

First Component

The aqueous ink jet composition contains C.I. Disperse Red 364 as the first component.

The first component is a red-based fluorescent dye. In addition, the first component is present mostly in a dispersed state in the aqueous ink jet composition.

In addition, C.I. Disperse Red 364 has a chemical structure represented by the following formula (3).

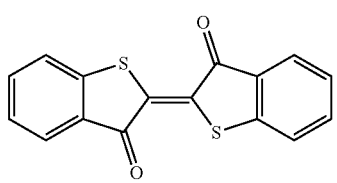

(3)

Although not particularly limited, the lower limit of the average particle diameter of the first component in the aqueous ink jet composition is preferably 50 nm, more preferably 75 nm, and further preferably 100 nm. In addition, although not particularly limited, the upper limit of the average particle diameter of the first component in the aqueous ink jet composition is preferably 250 nm, more preferably 200 nm, and further preferably 150 nm.

Accordingly, the storage stability of the aqueous ink jet composition is further improved. In addition, a recording portion formed using the aqueous ink jet composition can be more effectively sublimated, and the aqueous ink jet composition can be more preferably applied to sublimation dyeing.

In addition, in this specification, the average particle diameter indicates a volume-based average particle diameter unless otherwise particularly noted. The average particle diameter may be obtained by measurement, for example, using a Microtrac UPA (manufactured by Nikkiso Co., Ltd.).

Although not particularly limited, the lower limit of the content of the first component in the aqueous ink jet composition is preferably 0.5 percent by mass, more preferably 1.0 percent by mass, and further preferably 2.0 percent by mass. In addition, although not particularly limited, the upper limit of the content of the first component in the aqueous ink jet composition is preferably 25 percent by mass, more preferably 18 percent by mass, and further preferably 15 percent by mass.

Accordingly, in the recording portion formed using the aqueous ink jet composition, a higher color density and a higher fluorescent intensity can be obtained, and in addition, the storage stability of the aqueous ink jet composition can be further improved.

In particular, when the aqueous ink jet composition is an ink itself to be ejected by an ink jet method, the lower limit of the content of the first component in the ink is preferably 0.5 percent by mass, more preferably 1.0 percent by mass, and further preferably 2.0 percent by mass. In addition, when the aqueous ink jet composition is an ink itself to be ejected by an ink jet method, the upper limit of the content of the first component in the ink is preferably 13 percent by mass, more preferably 12 percent by mass, and further preferably 9.0 percent by mass.

In addition, when the aqueous ink jet composition is a stock solution to be used for preparation of an ink ejected by an ink jet method, the lower limit of the content of the first component in the stock solution is preferably 8.0 percent by mass, more preferably 9.0 percent by mass, and further preferably 10 percent by mass. In addition, when the aqueous ink jet composition is a stock solution to be used for preparation of an ink ejected by an ink jet method, the upper limit of the content of the first component in the stock solution is preferably 25 percent by mass, more preferably 20 percent by mass, and further preferably 18 percent by mass.

Second Component

The aqueous ink jet composition of the present disclosure contains the second component which is a dispersant having a chemical structure of at least on of a sulfo group and a salt thereof.

When the aqueous ink jet composition is applied to a recording apparatus by an ink jet method, the second component primarily has a function to improve the dispersibility of the first component while precipitation of the solid component of the ink-jet ink caused by drying is effectively prevented.

Although the second component which is a sulfonic acid-based dispersant is not particularly limited as long as having a chemical structure of at least one of a sulfo group and a salt thereof, that is, as long as having the structure in which $—SO_3^-$ is formed by ionization, the second component is preferably at least one selected from the group consisting of a formalin condensate of sodium naphthalenesulfonate, sodium ligninsulfonate, and a styrene-sodium styrenesulfonate copolymer and more preferably at least one selected from the group consisting of a formalin condensate of sodium naphthalenesulfonate and a styrene-sodium styrenesulfonate copolymer. In particular, the lower limit of the sum of the rate of the formalin condensate of sodium naphthalenesulfonate and the rate of the styrene-sodium styrenesulfonate copolymer in the entire second component forming the aqueous ink jet composition is preferably 50 percent by mass, more preferably 60 percent by mass, and further preferably 70 percent by mass. Although not particularly limited, the upper limit of the sum of the rate of the formalin condensate of sodium naphthalenesulfonate and the rate of the styrene-sodium styrenesulfonate copolymer in the entire second component forming the aqueous ink jet composition is 100 percent by mass.

Accordingly, the prevention in precipitation of the solid component of the ink-jet ink caused by drying and the improvement in dispersibility of the first component can be simultaneously obtained at a high level.

Although not particularly limited, the lower limit of the content of the second component in the aqueous ink jet composition is preferably 0.5 percent by mass, more preferably 1.0 percent by mass, and further preferably 2.0 percent by mass. In addition, although not particularly limited, the upper limit of the content of the second component in the aqueous ink jet composition is preferably 20 percent by mass, more preferably 18 percent by mass, and further preferably 15 percent by mass.

Accordingly, the contents of the first component and the third component can be effectively prevented from being excessively decreased, and while the functions thereof are more reliably obtained, the effect of the second component as described above can be more significantly obtained.

In particular, when the aqueous ink jet composition is an ink itself to be ejected by an ink jet method, the lower limit of the content of the second component in the ink is preferably 0.5 percent by mass, more preferably 1.0 percent by mass, and further preferably 2.0 percent by mass. In addition, when the aqueous ink jet composition is an ink itself to be ejected by an ink jet method, the upper limit of the content of the second component in the ink is preferably 13 percent by mass, more preferably 12 percent by mass, and further preferably 9.0 percent by mass.

In addition, when the aqueous ink jet composition is a stock solution to be used for preparation of an ink ejected by an ink jet method, the lower limit of the content of the second component in the stock solution is preferably 8.0 percent by mass, more preferably 9.0 percent by mass, and further preferably 10 percent by mass. In addition, when the aqueous ink jet composition is a stock solution to be used for preparation of an ink ejected by an ink jet method, the upper limit of the content of the second component in the stock solution is preferably 20 percent by mass, more preferably 19 percent by mass, and further preferably 18 percent by mass.

In addition, when the second component forming the aqueous ink jet composition contains at least two types of compounds, as the content thereof, the sum of the contents of the at least two types of compounds is to be used.

Third Component

The aqueous ink jet composition of the present disclosure contains the third component which has, besides the indigo skeleton, a chemical structure of at least one of a sulfo group and a salt thereof.

Since having the indigo skeleton which is a chemical structure present in the molecule of the first component and the chemical structure of at least one of a sulfo group and a salt thereof which is a chemical structure present in the molecule of the second component, the third component has an excellent affinity to the first component and the second component. Since the third component as described above is contained, the storage stability of the aqueous ink jet composition can be improved. In particular, while the functions of the first component and the second component as described above can be sufficiently obtained, the storage stability of the aqueous ink jet composition can be improved. In addition, the third component described above is a component which is not likely to adversely influence the sublimation dyeing.

Although the third component may be a component having in its molecule, besides the indigo skeleton, a chemical structure of at least one of a sulfo group and a salt thereof, C.I. Acid Blue 76 is preferable.

Accordingly, while the functions of the first component and the second component as described above can be more effectively obtained, the storage stability of the aqueous ink jet composition can be particularly improved.

In addition, C.I. Acid Blue 76 has a chemical structure represented by the following formula (4).

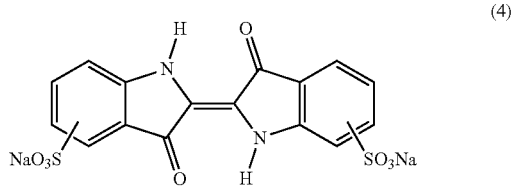

(4)

Although not particularly limited, the lower limit of the content of the third component in the aqueous ink jet composition is preferably 0.005 percent by mass, more preferably 0.03 percent by mass, and further preferably 0.04 percent by mass. In addition, although not particularly limited, the upper limit of the content of the third component in the aqueous ink jet composition is preferably 3.0 percent by mass, more preferably 1.50 percent by mass, and further preferably 0.90 percent by mass.

Accordingly, the contents of the first component and the second component can be effectively prevented from being excessively decreased, and while the functions thereof are more reliably obtained, the effect of the third component thus contained can be more significantly obtained.

In particular, when the aqueous ink jet composition is an ink itself to be ejected by an ink jet method, the lower limit of the content of the third component in the ink is preferably 0.005 percent by mass, more preferably 0.03 percent by mass, and further preferably 0.04 percent by mass. In addition, when the aqueous ink jet composition is an ink itself to be ejected by an ink jet method, the upper limit of the content of the third component in the ink is preferably 1.5 percent by mass, more preferably 1.2 percent by mass, and further preferably 1.0 percent by mass.

In addition, when the aqueous ink jet composition is a stock solution to be used for preparation of an ink ejected by an ink jet method, the lower limit of the content of the third component in the stock solution is preferably 0.02 percent by mass, more preferably 0.06 percent by mass, and further preferably 0.20 percent by mass. In addition, when the aqueous ink jet composition is a stock solution to be used for preparation of an ink ejected by an ink jet method, the upper limit of the content of the third component in the stock solution is preferably 3.0 percent by mass, more preferably 1.50 percent by mass, and further preferably 0.90 percent by mass.

In addition, when the third component forming the aqueous ink jet composition contains at least two types of compounds, as the content thereof, the sum of the contents of the at least two types of compounds is to be used.

In the aqueous ink jet composition, when the content of the first component is represented by X1 [percent by mass], and the content of the second component is represented by X2 [percent by mass], although not particularly limited, the lower limit of X2/X1 is preferably 0.2, more preferably 0.4, and further preferably 0.5. In addition, although not particularly limited, the upper limit of X2/X1 is preferably 5.0, more preferably 2.5, and further preferably 2.0.

Accordingly, the fluorescent intensity and the color tone of a recorded matter formed using the aqueous ink jet composition, the effect of preventing the precipitation of the solid component of the ink-jet ink caused by drying, the dispersibility of the first component in the ink-jet ink, and the like can be further improved.

In the aqueous ink jet composition, when the content of the first component is represented by X1 [percent by mass], and the content of the third component is represented by X3 [percent by mass], although not particularly limited, the lower limit of X3/X1 is preferably 0.005, more preferably 0.006, and further preferably 0.007. In addition, although not particularly limited, the upper limit of X3/X1 is preferably 0.400, more preferably 0.300, and further preferably 0.200.

Accordingly, the fluorescent intensity and the color tone of a recorded matter formed using the aqueous ink jet composition and the storage stability of the aqueous ink jet composition can be simultaneously obtained at a higher level.

In the aqueous ink jet composition, when the content of the second component is represented by X2 [percent by mass], and the content of the third component is represented by X3 [percent by mass], although not particularly limited, the lower limit of X3/X2 is preferably 0.004, more preferably 0.005, and further preferably 0.006. In addition, although not particularly limited, the upper limit of X3/X2 is preferably 0.300, more preferably 0.250, and further preferably 0.200.

Accordingly, while the precipitation of the solid component of the ink-jet ink caused by drying can be more effectively prevented, the storage stability of the aqueous ink jet composition can be further improved.

Water

The aqueous ink jet composition contains water. As this water, for example, purified water, such as reverse osmosis (RO) water, distilled water, or ion-exchanged water, may be used.

Although not particularly limited, the lower limit of the content of the water in the aqueous ink jet composition is preferably 30 percent by mass, more preferably 35 percent by mass, and further preferably 40 percent by mass. In addition, although not particularly limited, the upper limit of the content of the water in the aqueous ink jet composition is preferably 85 percent by mass, more preferably 80 percent by mass, and further preferably 75 percent by mass.

Accordingly, the viscosity of the aqueous ink jet composition can be more reliably controlled at a preferable value, and the ejection stability by an ink jet method can be further improved.

Solvent Other than Water

The aqueous ink jet composition may contain a solvent other than the water.

Accordingly, the viscosity of the aqueous ink jet composition can be preferably adjusted, and a moisture-retention property of the aqueous ink jet composition can be improved. As a result, liquid drop ejection by an ink jet method can be more stably performed.

As the solvent other than the water contained in the aqueous ink jet composition, for example, glycerin, propylene glycol, or 2-pyrrolidone may be mentioned.

Since at least one of those solvents is contained, an evaporation rate can be decreased because of an excellent moisture-retention property, and hence, stabler liquid drop ejection can be performed.

Although not particularly limited, the lower limit of the content of the solvent other than the water contained in the aqueous ink jet composition is preferably 1 percent by mass, more preferably 10 percent by mass, and further preferably 15 percent by mass. In addition, although not particularly limited, the upper limit of the content of the solvent other than the water contained in the aqueous ink jet composition is preferably 45 percent by mass, more preferably 43 percent by mass, and further preferably 40 percent by mass.

Accordingly, an effect of including the solvent other than the water can be more significantly obtained.

Surfactant

The aqueous ink jet composition may also contain a surfactant.

Accordingly, wettability of the aqueous ink jet composition to a recording medium can be further improved, and hence, a more preferable image quality can be advantageously obtained.

As the surfactant contained in the aqueous ink jet composition, for example, various types of surfactants, such as an anionic surfactant, a cationic surfactant, and a nonionic surfactant, may be used.

In more particular, as the surfactant contained in the aqueous ink jet composition, for example, an acetylene-based surfactant, a silicone-based surfactant, or a fluorine-based surfactant may be mentioned.

When the aqueous ink jet composition contains a silicone-based surfactant, the wettability of the aqueous ink jet composition to a recording medium can be further improved, and a recording portion having a more excellent tone gradation property can be formed.

When the aqueous ink jet composition contains a silicone-based surfactant, although not particularly limited, the lower limit of the content of the silicone-based surfactant in the aqueous ink jet composition is with respect to 100 parts by mass of the first component, preferably 4.0 parts by mass, more preferably 6.0 parts by mass, and further preferably 8.0 parts by mass. Although not particularly limited, the upper limit of the content of the silicone-based surfactant in the aqueous ink jet composition is with respect to 100 parts by mass of the first component, preferably 150 parts by mass, more preferably 140 parts by mass, and further preferably 70 parts by mass.

Accordingly, an effect of including the silicone-based surfactant described above can be more significantly obtained.

As a commercially available silicone-based surfactant, for example, there may be mentioned BYK-306, BYK-307, BYK-333, BYK-337, BYK-341, BYK-345, BYK-346, BYK-347, BYK-348, BYK-349, or BYK-378(trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017(trade name, manufactured by Shin-Etsu Chemical Co., Ltd.).

Other Components

The aqueous ink jet composition may contain at least one component other than the components described above. Hereinafter, the components as described above may also be called other components.

As the other components, for example, there may be mentioned a coloring agent other than that described above; a dispersant other than that described above; a penetrant, such as triethylene glycol monomethyl ether, triethylene glycol monobutyl ether, diethylene glycol monomethyl ether, 1,2-hexanediol, 1,2-pentanediol, 1,2-butanediol, or 3-methyl-1,5-penetandiol; a pH adjuster, a chelating agent, such as ethylenediaminetetraacetic acid salt, a fungicide/antiseptic agent, and/or a antirust agent. As the fungicide/antiseptic agent, for example, a compound having in its molecule, an isothiazolin cyclic structure may be preferably used.

The content of the other components is preferably 6 percent by mass or less and more preferably 4 percent by mass or less. In addition, as the other components, when at least two types of components are contained, it is preferable that the sum of the contents thereof satisfy the above condition.

In particular, when the aqueous ink jet composition of the present disclosure contains a dispersant other than the second component, the content of this dispersant is preferably 5 percent by mass or less and more preferably 3 percent by mass or less.

Although not particularly limited, the lower limit of the surface tension of the aqueous ink jet composition at 20° C. is preferably 20 mN/m, more preferably 21 mN/m, and further preferably 23 mN/m. In addition, although not particularly limited, the upper limit of the surface tension of the aqueous ink jet composition at 20° C. is preferably 50 mN/m, more preferably 40 mN/m, and further preferably 30 mN/m.

Accordingly, for example, clogging of a nozzle of an ejection device by an ink jet method is more unlikely to occur, and the ejection stability of the aqueous ink jet composition is further improved. In addition, even if the clogging of a nozzle occurs, when the nozzle is capped, that is, when capping is performed, the recovery property can be further improved.

In addition, as the surface tension, a value measured by Wilhelmy method may be used. For the measurement of the surface tension, for example, a surface tension meter (such as CBVP-7, manufactured by Kyowa Interface Science Co., Ltd.) may be used.

Although not particularly limited, the lower limit of the viscosity of the aqueous ink jet composition at 20° C. is preferably 2 mPa·s, more preferably 3 mPa·s, and further preferably 4 mPa·s. In addition, although not particularly limited, the upper limit of the viscosity of the aqueous ink jet composition at 20° C. is preferably 30 mPa·s, more preferably 20 mPa·s, and further preferably 10 mPa·s.

Accordingly, the ejection stability of the aqueous ink jet composition is further improved.

In addition, the viscosity can be measured at 20° C. using a viscoelastic tester (such as MCR-300, manufactured by Pysica) in such a way that the shear rate is increased from 10 [s$^{-1}$] to 1,000 [s$^{-1}$], and a viscosity at a shear rate of 200 is read.

When the aqueous ink jet composition of the present disclosure is an ink, in general, this ink is received in a container, such as a cartridge, a bag, or a tank, and is then applied to a recording apparatus by an ink jet method. In other words, the recording apparatus according to the present disclosure includes a container, such as an ink cartridge, receiving the aqueous ink jet composition of the present disclosure as the ink.

The aqueous ink jet composition of the present disclosure may be an ink to be ejected by an ink jet method or a stock solution to be used for preparation of the ink described above, and although a concrete structure of a device which ejects liquid droplets is not limited, the aqueous ink jet composition of the present disclosure is preferably applied to an air open-type recording apparatus and, in more particular, to an ink jet recording apparatus which includes, for example, an ink container having an ink charge port through which an ink can be replenished and a recording head having nozzle holes which eject the ink described above.

In the recording apparatus as described above, when an ink containing C.I. Disperse Red 364 is used, since the ink is in contact with the air, a problem in that foreign materials are particularly liable to be generated at a gas-liquid interface may arise; however, according to the present disclosure, even when the aqueous ink jet composition of the present disclosure is applied to the above recording apparatus, the problem as described above can be effectively prevented from being generated. That is, when the aqueous ink jet composition of the present disclosure is applied to an air open-type recording apparatus, the advantage of the present disclosure can be more significantly obtained.

Recording Method

The aqueous ink jet composition of the present disclosure may be applied, for example, to a direct printing method or a thermal transfer printing method, such as sublimation dyeing. In particular, since the first component which is a fluorescent dye has a sublimation property, and the third component which is a coloring component has substantially no sublimation property, while features, such as excellent color tone and excellent fluorescent intensity, of the first component are obtained, the third component is effectively prevented from adversely influencing the color tone of a final recorded matter; hence, the aqueous ink jet composition of the present disclosure can be preferably applied to a thermal transfer printing method.

Hereinafter, as a recording method using the aqueous ink jet composition of the present disclosure, a thermal transfer printing method, and in particular, one example of the sublimation dyeing, will be described.

A recording method of this embodiment includes an ink adhesion step of adhering an aqueous ink jet composition to an intermediate transfer medium by an ink jet method and a transfer step of heating the intermediate transfer medium to which the aqueous ink jet composition is adhered to transfer the first component contained in the aqueous ink jet composition as a sublimation dye to a recording medium.

Ink Adhesion Step

In the ink adhesion step, by an ink jet method, the aqueous ink jet composition is adhered to the intermediate transfer medium. The ejection of the aqueous ink jet composition by an ink jet method can be performed using a known ink jet recording apparatus. As an ejection method, for example, there may be used a piezoelectric method or a method in which an ink is ejected by bubbles generated by heating the ink. In particular, for example, since deterioration of the aqueous ink jet composition hardly occurs, a piezoelectric method is preferable.

In the ink adhesion step, an ink other than the aqueous ink jet composition according to the present disclosure may also be used in combination.

Intermediate Transfer Medium

As the intermediate transfer medium, for example, paper, such as regular paper, or a recording medium provided with an ink receiving layer may be used, and in more particular, for example, ink jet exclusive paper or a recording medium called coat paper or the like may be used. Among those mentioned above, paper provided with an ink receiving layer formed of inorganic fine particles, such as silica, is preferable. Accordingly, in a step in which the aqueous ink jet composition adhered to the intermediate transfer medium is dried, an intermediate transfer medium in which, for example, blurring is suppressed can be obtained. In addition, in the following transfer step, the sublimation of the first component tends to be more smoothly performed.

Transfer Step

Subsequently, the intermediate transfer medium to which the aqueous ink jet composition is adhered is heated, and the first component used as a constituent component of the aqueous ink jet composition is transferred to the recording medium. As a result, a recorded matter is obtained.

In particular, since the first component which is a fluorescent dye has a sublimation property, and the third component which is a coloring component has substantially no sublimation property, while the third component is effectively prevented from being transferred to the recording medium, the first component can be transferred to the recording medium. Hence, in a recorded matter thus obtained, while the features, such as excellent color tone and excellent fluorescent intensity, of the first component are obtained, the generation of the influence by the color tone of the third component can be effectively prevented.

Although not particularly limited, the lower limit of a heating temperature in this step is preferably 160° C. and more preferably 170° C. In addition, although not particularly limited, the upper limit of the heating temperature in this step is preferably 220° C. and more preferably 200° C.

Accordingly, energy required for the transfer can be further decreased, and the productivity of the recorded matter can be further improved. In addition, for example, the coloring property of the recorded matter thus obtained can be further improved.

Although depending on the heating temperature, the lower limit of a heating time in this step is preferably 30 seconds and more preferably 45 seconds. In addition, although depending on the heating temperature, the upper limit of the heating time in this step is preferably 90 seconds and more preferably 80 seconds.

Accordingly, the energy required for the transfer can be further decreased, and the productivity of the recorded matter can be further improved. In addition, for example, the coloring property of the recorded matter thus obtained can be further improved.

In addition, this step may be performed in such a way that the surface of the intermediate transfer medium to which the aqueous ink jet composition is adhered is heated while being separated from the recording medium by a predetermined distance or while being in close contact with the surface of the recording medium; however, this step is preferably performed in the state in which the surface of the intermediate transfer medium to which the aqueous ink jet composition is adhered is in close contact with the surface of the recording medium.

Accordingly, the energy required for the transfer can be further decreased, and the productivity of the recorded matter can be further improved. In addition, the coloring property of the recorded matter thus obtained can be further improved.

Recording Medium

Although the recording medium is not particularly limited, for example, there may be mentioned a cloth, such as a hydrophobic fiber cloth, a resin film, paper, glass, a metal, or a ceramic. In addition, as the recording medium, a material having a steric shape, such as a sheet shape, a spherical shape, or a rectangular parallelepiped shape, may also be used.

When the recording medium is a cloth, as fibers forming the cloth, for example, there may be mentioned polyester fibers, nylon fibers, triacetate fibers, diacetate fibers, polyamide fibers, or a blend using at least two types of the fibers mentioned above. In addition, there may also be used a blend using the fibers mentioned above with regenerated fibers, such as rayon, or a blend using the fibers mentioned above with natural fibers, such as cotton, silk, or wool.

In addition, when the recording medium is a resin film, as the resin film mentioned above, for example, a polyester film, a polyurethane film, a polycarbonate film, a poly (phenylene sulfide) film, a polyimide film, or a poly(amide imide) film may be mentioned.

In addition, the resin film may be a laminate formed by laminating a plurality of layers or may be a gradient material in which the composition of a material is gradiently changed.

Heretofore, although the preferable embodiments of the present disclosure have been described, the present disclosure is not limited thereto.

For example, the aqueous ink jet composition of the present disclosure may be a composition to be ejected by an ink jet method and may be a composition not applied to the recording method as described above.

For example, the aqueous ink jet composition of the present disclosure may be a composition to be applied to a method including, besides the steps described above, at least one another step.

In the case described above, as a pre-treatment step, for example, a step of applying a coat layer to the recording medium may be mentioned.

In addition, as an intermediate treatment step, for example, a step of pre-heating the recording medium may be mentioned. In addition, as a post-treatment step, for example, a step of washing the recording medium may be mentioned.

In addition, the aqueous ink jet composition of the present disclosure can also be preferably applied to sublimation transfer which uses no intermediate transfer medium. As the sublimation transfer which uses no intermediate transfer medium, for example, there may be mentioned a method including a step of adhering an aqueous ink jet composition by an ink jet method to a strippable ink receiving layer provided on a recording medium; a step of heating the recording medium as described above which is provided with the ink receiving layer to which the aqueous ink jet composition is adhered so as to perform sublimation diffusion dyeing from the ink receiving layer to the recording medium disposed thereunder; and a step of peeling off the ink receiving layer from the recording medium to obtain a recorded matter.

EXAMPLES

Next, concrete examples of the present disclosure will be described.

1. Preparation of Stock Solution for Ink-Jet Ink Production as Aqueous Ink Jet Composition Example A1

First, after C.I. Disperse Red 364 as the first component which was a fluorescent dye, a formalin condensate of sodium naphthalenesulfonate as the second component, C.I. Acid Blue 76 as the third component, and purified water were mixed together at a ratio shown in Table 1, a mixture thus obtained was stirred at 3,000 rpm by a high shear mixer (manufactured by Silverson) to form a slurry. Subsequently, the slurry thus formed was stirred and dispersed together with glass beads having a diameter of 0.5 mm by a bead mill (LMZ015, manufactured by Ashizawa Finetech Ltd.) in a water cooling atmosphere, so that a stock solution for ink-jet ink production was formed as an aqueous ink jet composition.

The average particle diameter of C.I. Disperse Red 364 in the stock solution for ink-jet ink production was 150 nm.

Comparative Example A1

Except for that the blending ratio between the components was set as shown in Table 1 without using the third component, a stock solution for ink-jet ink production as the aqueous ink jet composition was formed in a manner similar to that of Example A1.

The composition and the like of the stock solution for ink-jet ink production of each of the example and the comparative example are shown in Table 1. In addition, in the table, C.I. Disperse Red 364 is represented by "DR364", the formalin condensate of sodium naphthalenesulfonate is represented by "C2-1", and C.I. Acid Blue 76 is represented by "AB76". In addition, the stock solutions for ink-jet ink production of the example and the comparative example each had a viscosity in a range of 2 to 30 mPa·s, and the surface tension thereof was in a range of 25 to 50 mN/m. In addition, the viscosity was measured at 20° C. using a viscoelastic tester MCR-300 (manufactured by Pysica) in such a way the shear rate was increased from 10 [s$^{-1}$] to 1,000 [s$^1$], and a viscosity at a shear rate of 200 was read. In addition, the surface tension was measured at 20° C. by Wilhelmy method using a surface tension meter (CBVP-7, manufactured by Kyowa Interface Science Co., Ltd.).

TABLE 1

| | BLENDING AMOUNT (PARTS BY MASS) | | | | | | |
|---|---|---|---|---|---|---|---|
| | FIRST COMPONENT DR364 | SECOND COMPONENT C2-1 | THIRD COMPONENT AB76 | WATER | X2/X1 | X3/X1 | X3/X2 |
| EXAMPLE A1 | 15 | 15 | 3.0 | 67 | 1.0 | 0.200 | 0.200 |
| COMPARATIVE EXAMPLE A1 | 15 | 15 | 0 | 70 | 1.0 | 0 | 0 |

2. Evaluation of Stock Solution for Ink-Jet Ink Production 2-1. Storage Stability After the average particle diameter of the first component immediately after the production and the average particle diameter of the first component which was received in a predetermined container and then left for one week in an environment at 60° C. of the stock solution for ink-jet ink production of each of the example and the comparative example were obtained, from the values thus obtained, the rate of change in the average particle diameter of the first component which was left for one week in an environment at 60° C. to the average particle diameter of the first component immediately after the production was obtained, and evaluation was performed in accordance with the following criteria. In addition, for the measurement of the average particle diameter, a MIcrotrac UPA (manufactured by Nikkiso Co., Ltd.) was used. It can be said that as the rate of change in the average particle diameter is increased, the storage stability is degraded. B or more was regarded as a preferable level.

A: Rate of change in average particle diameter of less than 5%.

B: Rate of change in average particle diameter of 5% to less than 10%.

C Rate of change in average particle diameter of 10% or more.

Those results are collectively shown in Table 2.

TABLE 2

| | STORAGE STABILITY |
|---|---|
| EXAMPLE A1 | A |
| COMPARATIVE EXAMPLE A1 | C |

As apparent from Table 2, according to the present disclosure, excellent results are obtained. On the other hand, in the comparative example, a satisfactory result cannot be obtained.

3. Preparation of Ink-Jet Ink as Aqueous Ink Jet Composition

Example B1

After the stock solution for ink-jet ink production prepared in the above Example A1, glycerin, propylene glycol, BYK348 (manufactured by BYK Japan KK) as a silicone-based surfactant, and purified water were mixed together at a predetermined ratio, a mixture thus formed was stirred at 3,000 rpm by a high shear mixer (manufactured by Silverson), so that an ink-jet ink was formed as an aqueous ink jet composition having a composition shown in Table 3.

The average particle diameter of C.I. Disperse Red 364 in the ink-jet ink was 150 nm.

Example B2

First, after C.I. Disperse Red 364 as the first component which was a fluorescent dye, a formalin condensate of sodium naphthalenesulfonate as the second component, C.I. Acid Blue 76 as the third component, glycerin, propylene glycol, BYK348 (manufactured by BYK Japan KK) as a silicone-based surfactant, and purified water were mixed together at a predetermined ratio, a mixture thus formed was stirred at 3,000 rpm by a high shear mixer (manufactured by Silverson) to form a slurry. Subsequently, the slurry thus formed was stirred and dispersed together with glass beads having a diameter of 0.5 mm using a bead mill (LMZ015, manufactured by Ashizawa Finetech Ltd.) in a water cooling atmosphere, so that an ink-jet ink as an aqueous ink jet composition having a composition shown in Table 3 was formed.

The average particle diameter of C.I. Disperse Red 364 in the ink-jet ink was 150 nm.

Examples B3 to B6

Except for that the types of the first component, the second component, and the third component and the blending ratio therebetween were set as shown in Table 3, an ink-jet ink as the aqueous ink jet composition was formed in a manner similar to that of the above Example B2.

Comparative Example B1

The stock solution for ink-jet ink production prepared in the above Comparative Example A1, glycerin, propylene glycol, BYK348 (manufactured by BYK Japan KK) as a silicone-based surfactant, and purified water were mixed together at a predetermined ratio, a mixture thus formed was stirred at 3,000 rpm by a high shear mixer (manufactured by Silverson), so that an ink-jet ink as an aqueous ink jet composition having a composition shown in Table 3 was formed. That is, the ink-jet ink of this comparative example contained no third component.

The average particle diameter of C.I. Disperse Red 364 in the ink-jet ink was 150 nm.

Comparative Example B2

First, after C.I. Disperse Red 364 as the first component which was a fluorescent dye, C.I. Acid Blue 76 as the third component, a styrene-sodium acrylate copolymer as the dispersant, glycerin, propylene glycol, BYK348 (manufactured by BYK Japan KK) as a silicone-based surfactant, and purified water were mixed together at a predetermined ratio, a mixture thus formed was stirred at 3,000 rpm by a high shear mixer (manufactured by Silverson) to form a slurry. Subsequently, the slurry thus formed was stirred and dispersed together with glass beads having a diameter of 0.5 mm using a bead mill (LMZ015, manufactured by Ashizawa Finetech Ltd.) in a water cooling atmosphere, so that an ink-jet ink as an aqueous ink jet composition having a composition shown in Table 3 was formed. That is, the ink-jet ink of this comparative example contained no second component.

The average particle diameter of C.I. Disperse Red 364 in the ink-jet ink was 150 nm.

Comparative Examples B3 to B5

Except for that the types of the components used for preparation of the ink-jet ink and the blending ratio therebetween were set as shown in Table 3, an ink-jet ink as the aqueous ink jet composition was formed in a manner similar to that of the above Example B2.

The conditions of the ink-jet ink of each of the above examples and comparative examples are collectively shown in Table 3. In addition, in the table, C.I. Disperse Red 364 is represented by "DR364", the formalin condensate of sodium naphthalenesulfonate is represented by "C2-1", sodium ligninsulfonate is represented by "C2-2", the styrene-sodium styrenesulfonate copolymer is represented by "C2-3", C.I. Acid Blue 76 is represented by "AB76", glycerin is represented by "Gly", propylene glycol is represented by "PG", BYK348 (manufactured by BYK Japan KK) as a silicone-based surfactant is represented by "BYK348", C.I. Disperse Red 60 as another component is represented by "DR60", the styrene-sodium acrylate copolymer as another component is represented by "C2'", and C.I. Acid Blue 6 as another component is represented by "AB6". In addition, the ink-jet ink of each of the above Examples B1 to B6 had a viscosity in a range of 2.0 to 5.0 mPa·s, and the surface tension thereof was in a range of 20 to 35 mN/m. In addition, the viscosity was measured at 20° C. using a viscoelastic tester MCR-300 (manufactured by Pysica) in such a way that the shear rate was increased from 10 [s$^{-1}$] to 1,000 [s$^{-1}$], and a viscosity at a shear rate of 200 was read. In addition, the surface tension was measured at 20° C. by Wilhelmy method using a surface tension meter (CBVP-7, manufactured by Kyowa Interface Science Co., Ltd.). In addition, C.I. Disperse Red 60 has a chemical structure represented by the following formula (5), and C.I. Acid Blue 6 has a chemical structure represented by the following formula (6).

TABLE 3

| | BLENDING AMOUNT (PARTS BY MASS) | | | | | | | | | | | | | | |
|---|---|---|---|---|---|---|---|---|---|---|---|---|---|---|---|
| | FIRST COMPONENT | SECOND COMPONENT | | | THIRD COMPONENT | SOLVENTS OTHER THAN WATER | | SURFACTANT | OTHER COMPONENTS | | | | | | |
| | DR364 | C2-1 | C2-2 | C2-3 | AB76 | Gly | PG | BYK348 | DR60 | C2' | AB6 | WATER | X2/X1 | X3/X1 | X3/X2 |
| EXAMPLE B1 | 5.0 | 5.0 | 0 | 0 | 1.0 | 15 | 10 | 0.5 | 0 | 0 | 0 | 63.5 | 1.0 | 0.200 | 0.200 |
| EXAMPLE B2 | 5.0 | 5.0 | 0 | 0 | 0.10 | 15 | 10 | 0.5 | 0 | 0 | 0 | 64.4 | 1.0 | 0.020 | 0.020 |
| EXAMPLE B3 | 5.0 | 0 | 0 | 5.0 | 0.05 | 15 | 10 | 0.5 | 0 | 0 | 0 | 64.45 | 1.0 | 0.010 | 0.010 |
| EXAMPLE B4 | 0.4 | 0 | 0 | 5.0 | 0.05 | 20 | 10 | 0.5 | 0 | 0 | 0 | 64.05 | 12.5 | 0.125 | 0.010 |
| EXAMPLE B5 | 5.0 | 0 | 5.0 | 0 | 0.02 | 15 | 10 | 0.5 | 0 | 0 | 0 | 64.48 | 1.0 | 0.004 | 0.004 |
| EXAMPLE B6 | 5.0 | 2.5 | 0 | 2.5 | 0.10 | 15 | 10 | 0.5 | 0 | 0 | 0 | 64.4 | 1.0 | 0.020 | 0.020 |
| COMPARATIVE EXAMPLE B1 | 5.0 | 5.0 | 0 | 0 | 0 | 15 | 10 | 0.5 | 0 | 0 | 0 | 64.5 | 1.0 | 0 | 0 |
| COMPARATIVE EXAMPLE B2 | 5.0 | 0 | 0 | 0 | 0.05 | 15 | 10 | 0.5 | 0 | 5.0 | 0 | 64.45 | 0 | 0.010 | — |
| COMPARATIVE EXAMPLE B3 | 0 | 5.0 | 0 | 0 | 1.0 | 15 | 10 | 0.5 | 5.0 | 0 | 0 | 63.5 | — | — | 0.200 |
| COMPARATIVE EXAMPLE B4 | 5.0 | 0 | 0 | 0 | 0 | 15 | 10 | 0.5 | 0 | 5.0 | 0 | 64.5 | 0 | 0 | — |
| COMPARATIVE EXAMPLE B5 | 5.0 | 5.0 | 0 | 0 | 0 | 15 | 10 | 0.5 | 0 | 0 | 1.0 | 63.5 | 1.0 | 0 | 0 |

TABLE 3-continued

| BLENDING AMOUNT (PARTS BY MASS) | | | | | | | | | | | | | | |
|---|---|---|---|---|---|---|---|---|---|---|---|---|---|---|
| FIRST COMPONENT | SECOND COMPONENT | | | THIRD COMPONENT | SOLVENTS OTHER THAN WATER | | SURFACTANT | OTHER COMPONENTS | | | | | | |
| DR364 | C2-1 | C2-2 | C2-3 | AB76 | Gly | PG | BYK348 | DR60 | C2' | AB6 | WATER | X2/X1 | X3/X1 | X3/X2 |

(5)

(6)

4. Evaluation of Ink-Jet Ink 4-1. Storage Stability

After the average particle diameter of the first component immediately after the production and the average particle diameter of the first component which was received in a predetermined ink container and then left for one week in an environment at 60° C. of the ink-jet ink of each of the examples and comparative examples were obtained, from those values thus obtained, the rate of change in the average particle diameter of the first component which was left for one week in an environment at 60° C. to the average particle diameter of the first component immediately after the production was obtained, and evaluation was performed in accordance with the following criteria. However, in Comparative Example B3, as the "first component", "C.I. Disperse Red 60" was used.

In addition, for the measurement of the average particle diameter, a Microtrac UPA (manufactured by Nikkiso Co., Ltd.) was used. It can be said that as the rate of change in the average particle diameter is increased, the storage stability is degraded, and the ejection stability is adversely influenced. B or more was regarded as a preferable level.

A: Rate of change in average particle diameter of less than 5%.

B: Rate of change in average particle diameter of 5% to less than 10%.

C: Rate of change in average particle diameter of 10% to less than 15%.

D: Rate of change in average particle diameter of 15% to less than 20%.

E: Rate of change in average particle diameter of 20% or more.

4-2. Clogging Recovery Property

After the ink-jet ink of each of the examples and the comparative examples was filled in a predetermined ink container, this ink container was fitted to a recording apparatus PX-H6000 (manufactured by Seiko Epson Corporation) In addition, the ink container of the PX-H6000 manufactured by Seiko Epson Corporation has an ink charge port through which the aqueous ink jet composition can be replenished and is opened to the air when being fitted to the recording apparatus in a ready-to-use state.

After normal ejection from all nozzles was confirmed, the recording apparatus under normal conditions was placed in an Off state and then left for one month in an environment at 40° C.

Subsequently, the number of recovery operations by suction until the normal ejection was recovered was obtained, and evaluation was performed in accordance with the following criteria. B or more was regarded as a preferable level.

A: Normal ejection is performed immediately after a power source is placed in an ON state. Alternatively, normal ejection is performed by one recovery operation.

B: Normal ejection is performed by two to four recovery operations.

C: Normal ejection is performed by five to seven recovery operations.

D: Normal ejection is performed by eight to ten recovery operations.

E: Normal ejection is not performed by 11 recovery operations.

4-3. Coloring Property

After the ink-jet ink of each of the examples and comparative examples was filled in a predetermined ink container, this ink container was fitted to a recording apparatus PX-H6000 (manufactured by Seiko Epson Corporation)

After normal ejection from all nozzles was confirmed, the ink-jet ink was ejected, and a pattern having a recording resolution of 1,440×720 dpi and an application amount of 10% was adhered to TRANSJET Classic (manufactured by Cham Paper) functioning as an intermediate transfer medium. In addition, the operation environment of the recording apparatus was set at a temperature 40° C. and a relative humidity of 20%.

Subsequently, after one side of the intermediate transfer medium to which the aqueous ink jet composition was adhered was closely brought into contact with a cloth (100% of a polyester, Amina, manufactured by Toray Industries, Inc.) which was a white recording medium, and in the state described above, by using a heat press machine (TP-608M, manufactured by Taiyo Seiki Co., Ltd.), sublimation transfer was performed by heating at 200° C. for 60 seconds, so that a recorded matter was obtained.

Evaluation of fluorescence emission intensity was performed on the recorded matter thus obtained. In particular, by using a spectrodensitometer FD-7 (manufactured by Konica Minolta, Inc.), a fluorescent whitening intensity of a pattern portion having an application amount of 10% of the cloth which was the recorded matter was measured three times. The average value was obtained from the values thus measured, and evaluation was performed in accordance with the following criteria. In addition, the measurement conditions are as described below. C or more was regarded as a preferable level.

Measurement method: reflectance measurement
Lighting conditions: M1 [D50]
White density standard: absolute value
Observation field: 2°
Observation light source: D50
Polarization filter: not used.
A: Fluorescent whitening intensity of 3 or more.
B: Fluorescent whitening intensity of 2 to less than 3.
C: Fluorescent whitening intensity of 1 to less than 2.
D: Fluorescent whitening intensity of less than 1.
Those results are collectively shown in Table 4.

TABLE 4

| | STORAGE STABILITY | CLOGGING RECOVERY PROPERTY | COLORING PROPERTY |
|---|---|---|---|
| EXAMPLE B1 | A | A | A |
| EXAMPLE B2 | A | A | A |
| EXAMPLE B3 | A | A | A |
| EXAMPLE B4 | A | A | B |
| EXAMPLE B5 | B | B | A |
| EXAMPLE B6 | A | A | A |
| COMPARATIVE EXAMPLE B1 | C | C | A |
| COMPARATIVE EXAMPLE B2 | E | B | A |
| COMPARATIVE EXAMPLE B3 | A | B | D |
| COMPARATIVE EXAMPLE B4 | E | C | A |
| COMPARATIVE EXAMPLE B5 | C | E | A |

As apparent from Table 4, according to the present disclosure, excellent results are obtained. On the other hand, according to the comparative examples, satisfactory results cannot be obtained. In addition, according to the present disclosure, although the first component is preferably transferred to a final recorded matter, the third component remains on the intermediate transfer medium, and in the recorded matter, the third component has no adverse influence on the appearance and the like, so that an excellent color tone of the first component can be obtained.

What is claimed is:

1. An aqueous ink jet composition comprising:
   C.I. Disperse Red 364 as a first component;
   a second component which is a dispersant having a chemical structure of at least one of a sulfo group and a salt thereof; and
   a third component having an indigo skeleton and a chemical structure of at least one of a sulfo group and a salt thereof.

2. The aqueous ink jet composition according to claim 1, wherein
   the second component is at least one selected from the group consisting of a formalin condensate of sodium naphthalenesulfonate, sodium ligninsulfonate, and a styrene-sodium styrenesulfonate copolymer.

3. The aqueous ink jet composition according to claim 1, wherein
   the third component is C.I. Acid Blue 76.

4. The aqueous ink jet composition according to claim 1, wherein
   $0.2 \leq X2/X1 \leq 5.0$, the content of the first component and the content of the second component being represented by X1 and X2, respectively, in percent by mass.

5. The aqueous ink jet composition according to claim 1, wherein
   $0.005 \leq X3/X1 \leq 0.400$, the content of the first component and the content of the third component being represented by X1 and X3, respectively, in percent by mass.

6. The aqueous ink jet composition according to claim 1, wherein
   $0.004 \leq X3/X2 \leq 0.300$, the content of the second component and the content of the third component being represented by X2 and X3, respectively, in percent by mass.

* * * * *